United States Patent
Regmi et al.

(10) Patent No.: US 12,032,569 B2
(45) Date of Patent: Jul. 9, 2024

(54) SYSTEM AND METHOD FOR SCRIPT-BASED QUERYING AND AGGREGATION OF ENDPOINT DATA VIA A DIRECTORY ACCESS PROTOCOL

(71) Applicant: BANK OF AMERICA CORPORATION, Charlotte, NC (US)

(72) Inventors: Ambarish Regmi, Huntersville, NC (US); Elizabeth Anne Bueche, Waxhaw, NC (US); Vineesh Chandran Pillai, Arlington Heights, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 142 days.

(21) Appl. No.: 17/903,403

(22) Filed: Sep. 6, 2022

(65) Prior Publication Data
US 2024/0078228 A1    Mar. 7, 2024

(51) Int. Cl.
*G06F 16/20* (2019.01)
*G06F 16/245* (2019.01)
*H04L 67/1097* (2022.01)

(52) U.S. Cl.
CPC ........ *G06F 16/245* (2019.01); *H04L 67/1097* (2013.01)

(58) Field of Classification Search
None
See application file for complete search history.

(56) References Cited

U.S. PATENT DOCUMENTS

| | | | |
|---|---|---|---|
| 6,230,199 B1 | 5/2001 | Revashetti et al. | |
| 7,653,750 B2 | 1/2010 | Fleming | |
| 8,281,019 B1 | 10/2012 | Woodard et al. | |
| 8,484,718 B2 | 7/2013 | Chacko et al. | |
| 8,838,794 B2 | 9/2014 | Greenlee et al. | |
| 8,997,182 B2 | 3/2015 | Jeong et al. | |
| 9,092,397 B1 | 7/2015 | Kurtz et al. | |
| 9,143,407 B2 | 9/2015 | Chen et al. | |
| 9,258,266 B2 | 2/2016 | Nataraja et al. | |
| 9,552,480 B2 | 1/2017 | Bell, Jr. et al. | |
| 9,628,357 B2 | 4/2017 | Hernandez et al. | |
| 9,838,383 B1 * | 12/2017 | Perlmuter | H04L 63/083 |
| 9,846,630 B2 | 12/2017 | Kumar | |
| 10,263,947 B2 | 4/2019 | Vats et al. | |
| 10,423,433 B2 | 9/2019 | Kolesnik et al. | |
| 10,447,610 B1 * | 10/2019 | Shah | H04L 47/70 |
| 10,721,237 B2 | 7/2020 | Vats et al. | |
| 2003/0115484 A1 | 6/2003 | Moriconi et al. | |
| 2004/0039646 A1 | 2/2004 | Hacker | |

(Continued)

*Primary Examiner* — Belix M Ortiz Ditren
(74) *Attorney, Agent, or Firm* — Moore & Van Allen PLLC; Andrew T. Wood (57) ABSTRACT

Systems, computer program products, and methods are described herein for script-based querying and aggregation of endpoint data via a directory access protocol. The present invention is configured to deploy a directory access protocol executor to a plurality of endpoint devices, determine an operating system for at least one of the plurality of endpoint devices, select a script to execute at the plurality of endpoint devices, and execute the script via the directory access protocol executor, wherein the script is executed as a login script, wherein the script determines a status of endpoint data at the endpoint, and wherein the endpoint data comprises endpoint tools currently available at the endpoint.

18 Claims, 5 Drawing Sheets

(56) References Cited

U.S. PATENT DOCUMENTS

| | | |
|---|---|---|
| 2006/0059262 A1 | 3/2006 | Adkinson et al. |
| 2015/0066572 A1* | 3/2015 | McLaren ......... G06Q 10/06316 |
| | | 705/7.26 |
| 2015/0207665 A1 | 7/2015 | Basso et al. |
| 2017/0075921 A1* | 3/2017 | Benton ................... H04L 67/02 |
| 2018/0032946 A1 | 2/2018 | Maynard et al. |
| 2019/0087900 A1* | 3/2019 | Crowley ................ G06Q 40/04 |
| 2020/0053096 A1* | 2/2020 | Bendersky .............. G06F 21/32 |
| 2020/0137097 A1* | 4/2020 | Zimmermann ..... H04L 63/1425 |
| 2024/0036910 A1* | 2/2024 | Stephen .............. G06F 9/45558 |

* cited by examiner

FIGURE 3

SYSTEM AND METHOD FOR SCRIPT-BASED QUERYING AND AGGREGATION OF ENDPOINT DATA VIA A DIRECTORY ACCESS PROTOCOL

FIELD OF THE INVENTION

The present invention embraces a system for script-based querying and aggregation of endpoint data via a directory access protocol.

BACKGROUND

Currently, entities find difficulty in determining and maintaining an accurate inventory of endpoint devices and endpoint tools thereon. Entities may have numerous departments using a wide array of endpoint devices, with varying types of endpoint tools installed. Accordingly, it is difficult for entities to determine at any given point the exact number of said endpoint devices and endpoint tools, or whether an endpoint tool is currently running on an endpoint device, what version of the endpoint tool is running, etc. Traditionally, an entity may rely on inventory counts from each of the numerous departments, individually, and thereafter attempt to combine said inventory counts to calculate the total number of endpoint devices or endpoint tools across the entire entity. Inevitably, this leads to an inaccurate inventory, which can further lead to incorrect planning, forecasting, and purchasing of endpoint devices and endpoint tools to service any users associated with the entity. As a result, the needs of the entity who is attempting to provide such service are unmet and thus resulting in loss of productivity, added expenses, unexpected delays, or the like. As such, there is a need for a system and method for script-based querying and aggregation of endpoint data via a directory access protocol.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for script-based querying and aggregation of endpoint data via a directory access protocol, the invention comprising deploying a directory access protocol executor to a plurality of endpoint devices, wherein the directory access protocol executor is previously installed on the plurality of endpoint devices, and wherein the directory access protocol executor communicates with a directory access protocol service located at a centralized server, determining an operating system for at least one of the plurality of endpoint devices, selecting a script to execute at the plurality of endpoint devices, the script selected from a plurality of scripts and corresponding to the operating system determined, and executing the script via the directory access protocol executor, wherein the script is executed as a login script, wherein the script determines a status of endpoint data at the endpoint, and wherein the endpoint data comprises endpoint tools currently available at the endpoint.

In some embodiments, the system, computer program product, or the method may include collecting the status of the endpoint data, the status of the endpoint data recorded by the script as at least one binary output, aggregating the at least one binary output into an output package, transmitting the output package to a centralized inventory database, and transforming the output package into a dashboard, wherein transforming occurs in real time as new output packages are transmitted to the centralized inventory database.

In some embodiments, the endpoint data further includes a usage status of the endpoint tools.

In some embodiments, the endpoint data further includes a release version number of the endpoint tools.

In some embodiments, the usage status includes a timestamp of a previous session of the endpoint tools and a duration of usage over an indicated time period.

In some embodiments, the dashboard is structured for grouping and searching of the at least one binary output In some embodiments, the at least one binary output is identified by an endpoint identifier such that each of the at least one binary output is associated with a corresponding endpoint.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as communication data. Typically, these data can be related to the people who work for the organization, its products or services, the customers or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "directory access protocol" or "lightweight directory access protocol" ("LDAP") may refer to any industry standard application protocol for maintaining and accessing directory services information over a network. A common use of a directory access protocol is to provide a location to store login credentials for users in an entity, such that various services can connect to the directory access protocol for verification and validation of users. The directory access protocol may use queries to actively receive information from an "active directory," which is a service that manages users, domains, and distributed resources for various "operating systems" such as Microsoft Windows, Apple MacOS, Linux, iOS, Android OS, or the like. Accordingly, the directory access protocol is the communication protocol between an exchange server and the active directory. In some embodiments of the invention as will be described in greater detail herein, the directory access protocol may be agnostic to the operating system or endpoint device, and may function regardless of whether the operating system is Microsoft Windows, Apple MacOS, Linux, iOS, Android OS, or the like. In other embodiments, the directory access protocol may be specific to the operating system, such that the directory access protocol for a Microsoft Windows endpoint device may be adapted for use with Microsoft Windows, whereas the directory access protocol for a MacOS endpoint device may be adapted for use with MacOS.

As used herein, a "directory access protocol executor" may refer to a particular execution function of the directory access protocol. The directory access protocol executor may be structured to execute one or more scripts (e.g., computer code) at the endpoint device of a user. For example, when a user logs into their endpoint device, the directory access protocol executor may execute a script to perform a function within the computing system and relay information as a result of the function to and/or from an exchange server and active directory.

As used herein, "endpoint data" may refer to any data regarding the endpoint device and endpoint tools thereon which the directory access protocol executor and script(s) are inquiring. In the invention described herein, this may include, but is not limited to, the status of the endpoint tools located on the endpoint device, the usage status of the endpoint tools located on the endpoint device, such as a timestamp for a previous session of the endpoint tools and duration of usage of the endpoint tools over a period of time, the release version (e.g., software version number, or build number), or the like.

As used herein, "endpoint tools" may refer to computer programs or other software installed on an endpoint device. Some non-limiting examples of endpoint tools may include email and word processing software, accounting software, computer programming software, spreadsheet software, audio/visual media production software, and so forth. Endpoint tools may encompass any utility installed onto a computer device or virtual machine of a user which works in accord with the operating system thereon. Accordingly, it shall be understood that not only are there a tremendous number of endpoint tools available for installation and use, but there are also numerous versions, releases, and revisions thereof. As noted previously, an entity may desire the inquiry into the installation status of various endpoint tools across the entity.

As used herein, a "dashboard" may refer to a program, application, script, or other computer tool used by a user associated with the entity to gain a visual and/or numerical representation of the output of any of the portions of the output of the script executed by the directory access protocol executor of the invention as described herein. The dashboard may be displayed on a user interface, such as a graphical user interface of an endpoint device, and may be further configured to sort, group, filter, or otherwise arrange data provided to the dashboard. In this way, and as will be explained in greater detail herein, the user associated with the entity who is interested in making decisions or communicating information regarding the data will be presented with the data in a customizable, digestible, and easy to read format.

Prior to the invention described herein, entities did not have a system and method for determining the installation status, usage, version, or other details of endpoint tools and corresponding endpoint data across an entity, especially given the breadth of software types, the wide array of operating systems, and the physical distance between endpoint devices and users of said endpoint devices.

The invention disclosed herein provides a novel approach to using a directory access protocol executor at numerous endpoint devices, in an operating system agnostic way, to determine a status of endpoint data at each of the endpoints, collecting the endpoint data, aggregating the endpoint data, transmitting and transforming the endpoint data into a dashboard, whereby a user associated with the entity can perform an inventory analysis of the endpoints and the endpoint data thereon to aid in resource planning, project rollout, or other necessary functions of the entity reliant on the inventory calculation.

Accordingly, in the present invention, the system deploys a directory access protocol executor to a plurality of endpoint devices, wherein the directory access protocol executor is previously installed on the plurality of endpoint devices, and wherein the directory access protocol executor communicates with a directory access protocol service located at a centralized server. The system then determines an operating system for at least one of the plurality of endpoint devices and selects a script to execute at the plurality of endpoint devices, the script selected from a plurality of scripts and corresponding to the operating system determined. Next, the endpoint executes the script via the directory access protocol executor, wherein the script is executed as a login script, wherein the script determines a status of endpoint data at the endpoint, and wherein the endpoint data comprises endpoint tools currently available at the endpoint.

What is more, the present invention provides a technical solution to a technical problem. As described herein, the technical problem includes inability for entities to assess inventory levels of endpoint devices and endpoint tools thereon. The technical solution presented herein allows for a script to be executed by a directory access protocol executor, which is agnostic to the operating system of the endpoint device, and thereafter retrieve endpoint data specific to each endpoint device. Further, the endpoint data can be utilized to aggregate, transform, and transmit binary outputs to a dashboard for endpoint data viewing and manipulation by a user associated with an entity. In particular, the system is an improvement over existing endpoint inventory management solutions by assessing endpoint device and endpoint data inventory (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

Figure 1A:
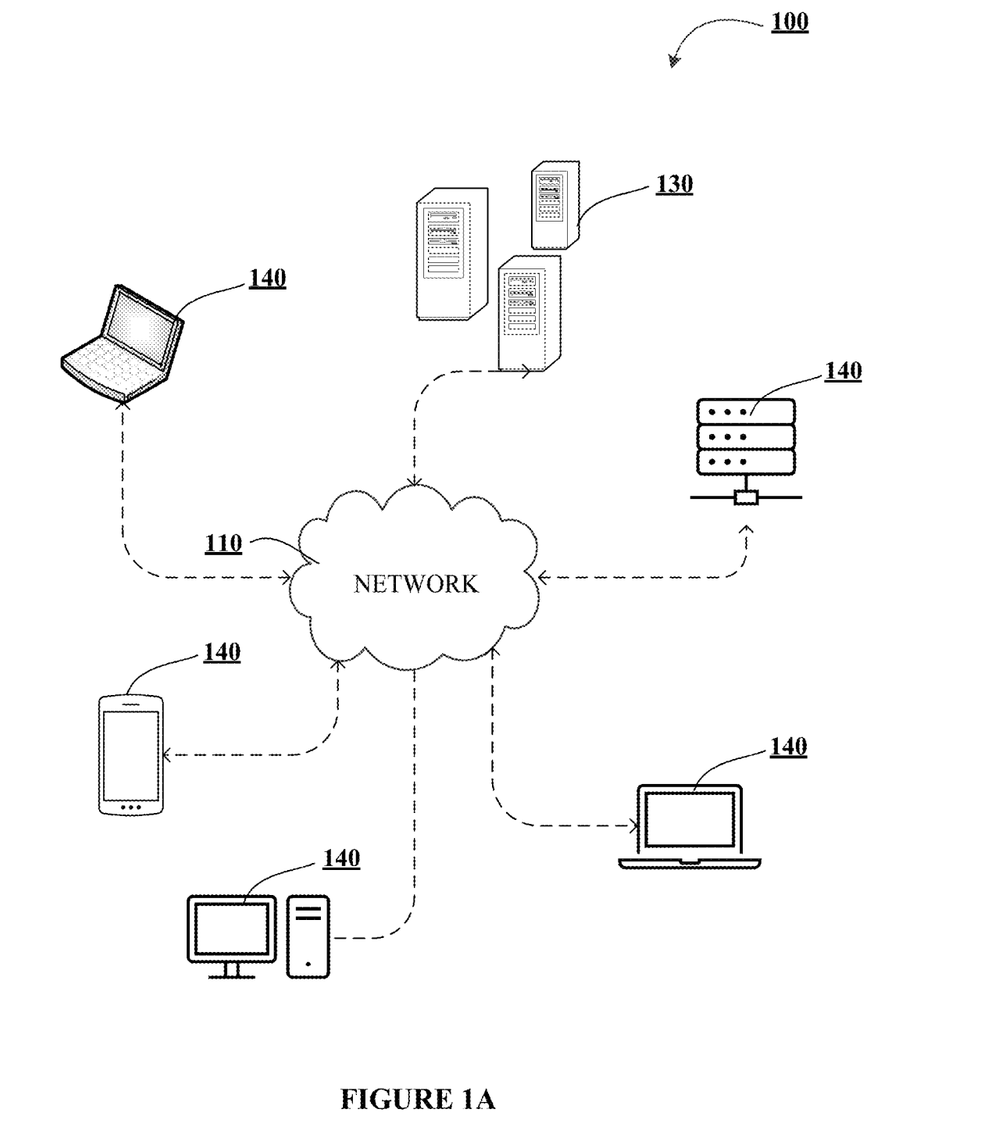
FIGS. 1A-1C illustrates technical components of an exemplary distributed computing environment for script-based querying and aggregation of endpoint data via a directory access protocol, in accordance with an embodiment of the invention.
Figure 1B:
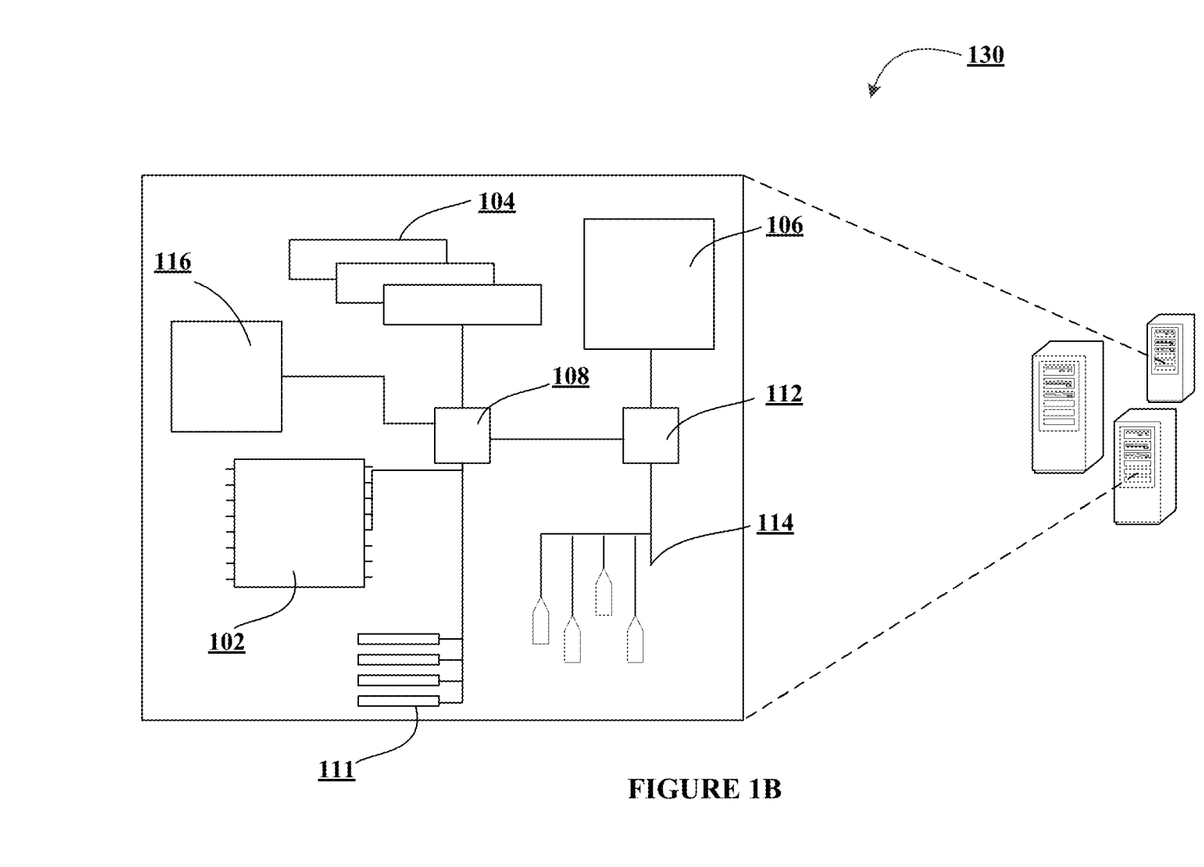
Figure 1C:
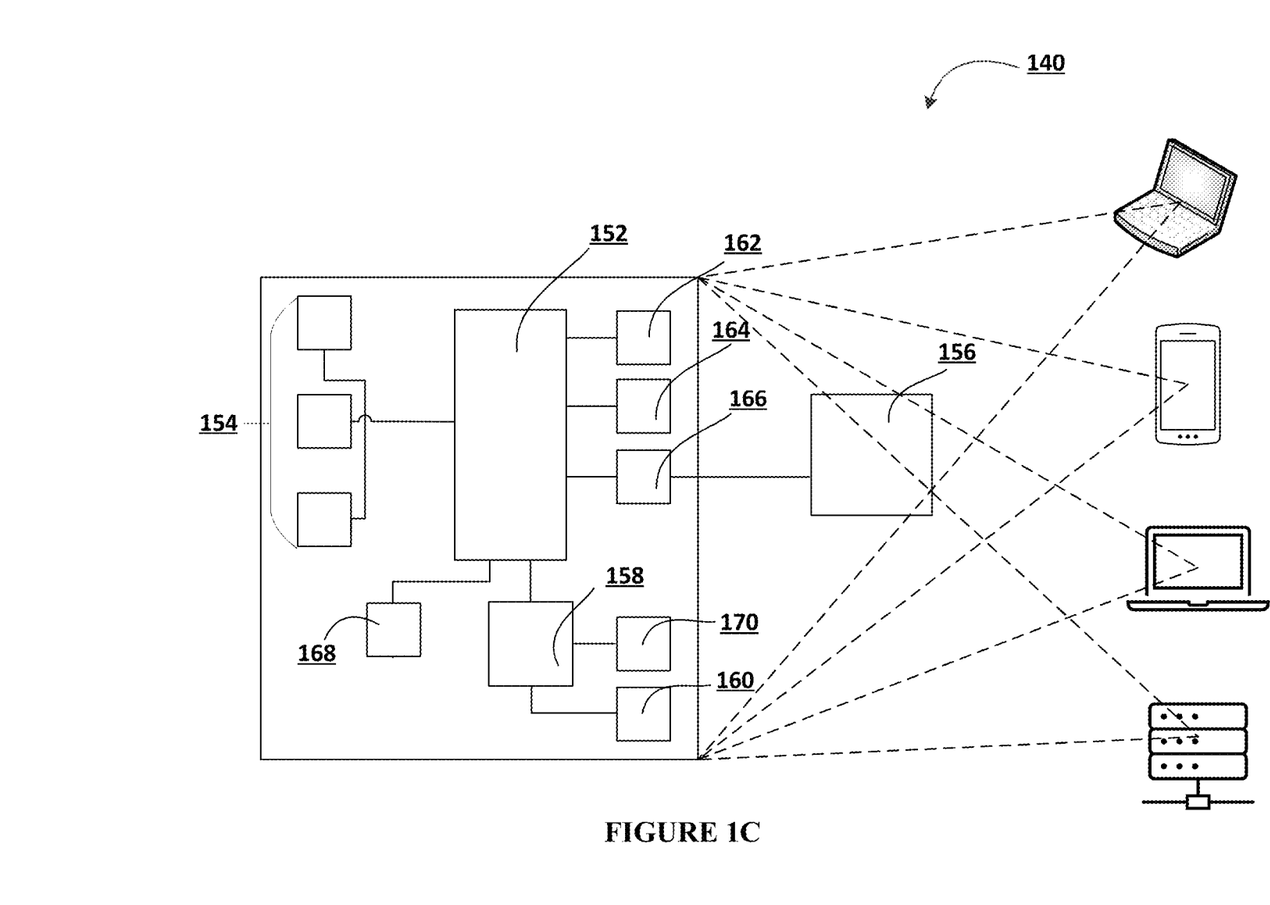

FIGS. 1A-1C illustrate technical components of an exemplary distributed computing environment for script-based querying and aggregation of endpoint data via a directory access protocol 100, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

Figure 2:
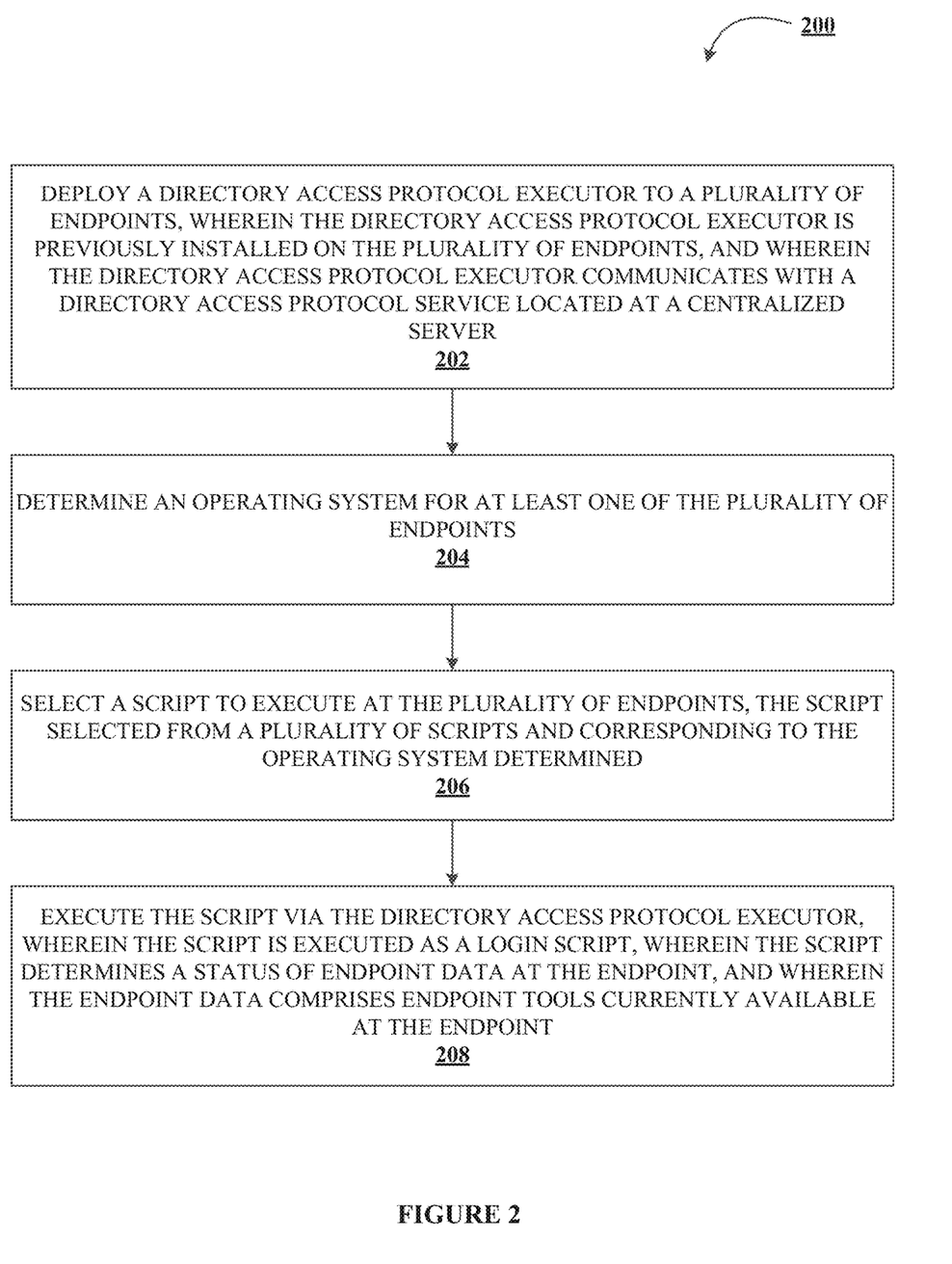
FIG. 2 illustrates a process flow for script-based querying and aggregation of endpoint data via a directory access protocol, in accordance with an embodiment of the invention.

FIG. 2 illustrates a process flow 200 for script-based querying and aggregation of endpoint data via a directory access protocol, in accordance with an embodiment of the invention. The process begins at block 202, wherein the system deploys a directory access protocol executor to a plurality of endpoint devices, wherein the directory access protocol executor is previously installed on the plurality of endpoint devices, and wherein the directory access protocol executor communicates with a directory access protocol service located at a centralized server.

It shall be appreciated that one of the key advantages of the system as described is that no additional software or applications are required for installation on the endpoint devices prior to receiving the endpoint data. Accordingly, each of the endpoint devices on the network may be operatively coupled to a centralized server wherein the system deploys a directory access protocol executor to all of the endpoint devices.

As previously described, the directory access protocol executor communicates with a directory access protocol service. The directory access protocol enables users to locate data about the entity, individuals and other resources such as files and devices in the network, and is located at a centralized server. The directory access protocol may be organized in a tree hierarchy consisting of a root directory which branches out to countries, organizational units, individuals, or the like. The directory access protocol is used to communicate with an active directory or any other directory service for managing domains, users, distributed resources, or the like. The active directory contains information regarding users' accounts across the network and treats them as objects, and the directory access protocol extracts this information in a usable format. Further, the directory access protocol uses a string-based query to extract information from the active directory.

The process continues in block 204, wherein the system determines an operating system for at least one of the plurality of endpoint devices. Across an entity, there may be numerous endpoint devices that are configured to run several different operating systems, such as Microsoft Windows, Apple MacOS, Linux, or the like, and accordingly the system must determine which endpoint systems are using which operating system. The system may determine the operating system of any given endpoint system by utilizing existing operating system information on the active directory.

In some embodiments, the directory access protocol may be specific to each operating system, such that each directory access protocol may communicate with a centralized active directory. In this way, the system described herein may detect the operating system by analyzing the specific directory access protocol used.

Next, the process continues in block 206, wherein the system selects a script to execute at the plurality of endpoint devices, the script selected from a plurality of scripts and corresponding to the operating system determined. It shall be understood that each of the operating systems on the endpoint devices, and in some embodiments the directory access protocol thereon, may require unique scripts for execution of the system as described herein in order to receive the endpoint data and thereafter determine inventory data therefrom. In this way, as one non-limiting example, a script for execution on a Microsoft Windows-enabled endpoint device may require a different script than that which is to be used for a Linux-enabled device, and vice-versa.

The system is configured to only choose or select the script to send based on the operating system on the endpoint device or the group of endpoint devices which is being targeted. Accordingly, at any given point, one or more scripts may be available to the system or stored in the memory device of the system. In this way, efficiency is increased, and errors related to the script execution are minimized, resulting in a more accurate inventory count of the endpoint device and/or endpoint data.

The process then continues in block 208, wherein the system executes the script via the directory access protocol executor, wherein the script is executed as a login script, wherein the script determines a status of endpoint data at the endpoint, and wherein the endpoint data comprises endpoint tools currently available at the endpoint.

The directory access protocol is able to execute any number of the scripts, and as described herein, the directory access protocol will utilize a directory access protocol executor (e.g., an executor function of the directory access protocol) to execute the script as determined in block 206.

The script may be executed during login, such that when a user provides their login credentials (such as username and passwords, for example user or employee identification number(s), email address, alphanumeric strings, biometric data such as fingerprint or facial/retinal scanning, and so forth) to an endpoint device, once the directory access protocol validates the user's credentials, the script is executed at the endpoint device. In this way, the script may be executed in the background as part of the login process without the express knowledge of the user or any input or affirmation required by the user. Accordingly, the script may be executed before, during, or after the user inputs their login credentials and before, during, or after the directory access protocol communicates with the active directory regarding the verification or validation of the user's login credentials.

The script is coded or programmed to determine a status of endpoint data via the registry of each endpoint device once the script has been executed. For example, once the script executes, the script searches the directory of the endpoint device to retrieve the status endpoint data. The endpoint data may be information regarding whether a particular program or application (e.g., an "endpoint tool") is currently installed on an endpoint device (e.g., the "status"). To search or query the registry or other portions of the endpoint device, the script may be populated with at least a portion of the name of the endpoint tool, for example "Word Processor". In some embodiments, to search or query the registry or other portions of the endpoint device, the script may be populated with at least a portion of the name of the executable file associated with a particular endpoint tool, for example "wordprocessor.exe" or "wordprocessor.app", XML, files associated with the endpoint tool, or the like.

In some embodiments, the script may be configured to search for a singular endpoint tool, and as such the endpoint data may only be recorded as a singular binary output. However, it shall be appreciated that the script in other embodiments may be configured to search for a plurality of endpoint tools, such that the endpoint data is recorded as a plurality of binary outputs related to the plurality of endpoint tools. In other embodiments, it shall also be appreciated that the endpoint data may comprise multiple binary outputs for a singular endpoint tool, such as the status of the endpoint tool, the release version number, and so forth. Accordingly, in yet additional embodiments, it shall be appreciated that the endpoint data may comprise multiple binary outputs for a plurality of endpoint tools, such as the statuses of the plurality of endpoint tools, the release version numbers for the plurality of endpoint tools, and so forth This endpoint data may be recorded as a simple binary output such that a "0" is recorded for when an endpoint device does not contain an endpoint tool, or a "1" is recorded when an endpoint device does contain the endpoint tool. In another embodiment, a "1" may be recorded for an endpoint device when it does not contain the endpoint tool, and a "0" when the endpoint device does contain the endpoint tool.

In some embodiments, the endpoint data may further comprise a release version number of the endpoint tools. While the system may determine the status of endpoint data regarding whether or not endpoint tools are installed at an endpoint device, it may also be valuable for the system to determine the release version number of one or more endpoint tools in order to make the determination that the endpoint tool(s) at the endpoint device is the appropriately up to date. For example, the system may query the registry of an endpoint device in search of an endpoint tool with a version number "2.0.0". If the system determines that the endpoint tool is version number "1.8.1", the system may accordingly record a binary output of "0" to indicate that the expected release number of the endpoint tool is not installed. If the expected release number of the endpoint tool is installed, the system may record a binary output of "1".

It shall be appreciated that the system may also be structured to determine a usage status of one or more endpoint tools. For example, the system may retrieve and determine from the registry of the endpoint device whether the one or more endpoint tools are currently running (e.g., have been launched in an active session of the operating system), and thereafter the system may assign a binary output such as "1" or "0" to indicate the usage status of the endpoint tool. As previously described, either "1" or "0" binary indicators may represent a positive usage status such that the endpoint tool is being used, whereas the other (e.g., the other binary indicator not chosen) may be used to represent that the endpoint tool is not being used.

In some embodiments, the usage status may comprise a timestamp of a previous session of one or more endpoint tools. It shall be appreciated that the registry of an endpoint device or other similar structure may recount the time, via a timestamp provided by the clock of the endpoint device, the last known usage of any endpoint tool. In this way, the script executed by the directory access protocol executor may be structured to return a binary output if one or more endpoint tools have been used within a timeframe, such as within the prior hour, day, week, month, year, and so forth. Accordingly, the system will be able to determine, even if the endpoint tool is not running at the time the script is executed, if the endpoint tool has been used recently.

In additional embodiments, the usage status may comprise a duration of usage over an indicated time period. It shall be appreciated that the registry of an endpoint device or other similar structure may recount the duration of use of an endpoint tool, via multiple timestamps provided by the clock of the endpoint device. In this way, the script executed by the directory access protocol executor may be structured to return a binary output if one or more endpoint tools have been used for a given amount of time (for example, used for more than an hour, 10 hours, 100 hours, etc.) within a timeframe, such as within the prior hour, day, week, month, year, and so forth. Accordingly, the system will be able to determine, even if the endpoint tool is not running at the time the script is executed, how often the endpoint tool has been used. This may provide the entity with valuable information regarding the usage demand of the endpoint tool, and if there are any opportunities for endpoint tool license sharing, revocation, or the like.

Figure 3:
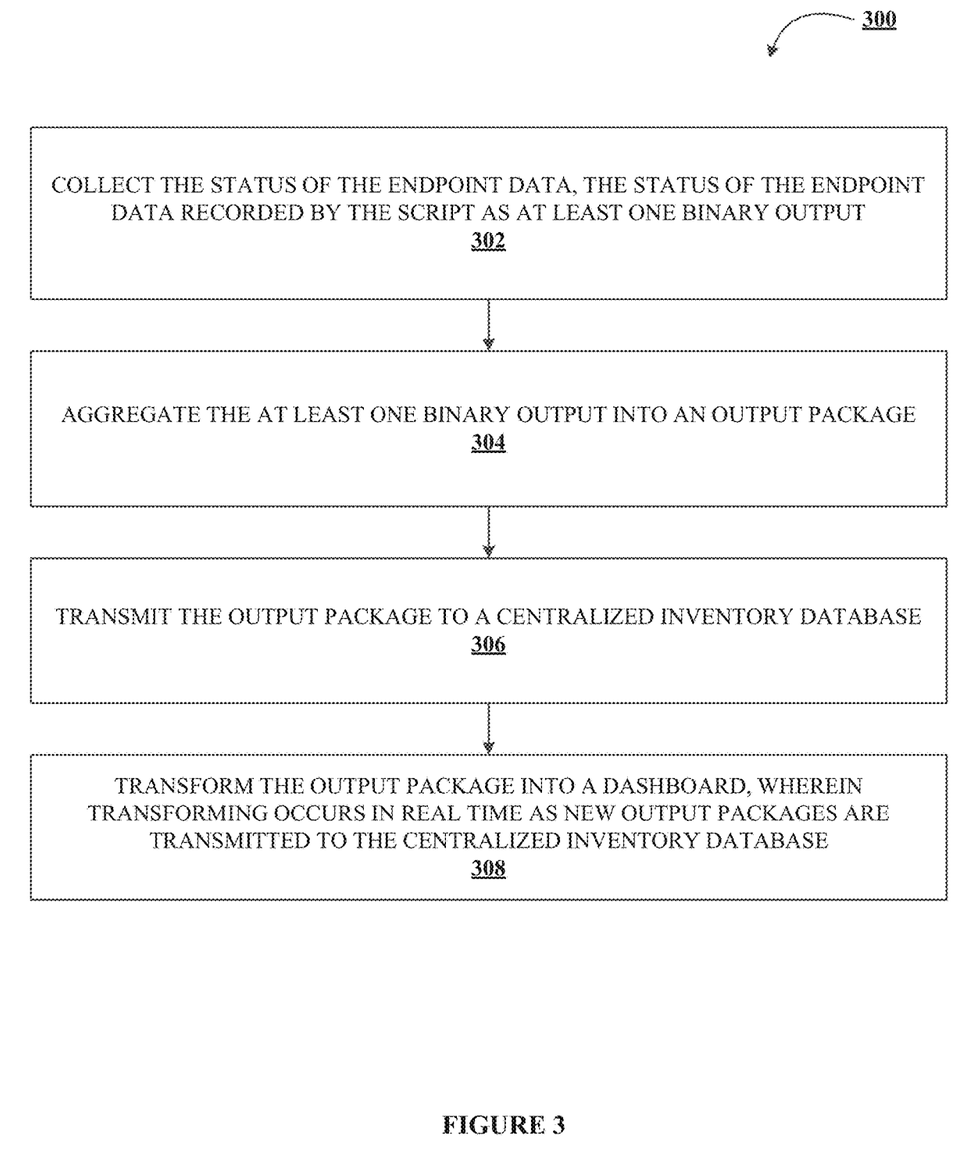
FIG. 3 illustrates a process flow for script-based querying and aggregation of endpoint data via a directory access protocol, in accordance with an embodiment of the invention.

FIG. 3 illustrates a process flow 300 for script-based querying and aggregation of endpoint data via a directory access protocol. It shall be appreciated that the process flow 300 integrates within the process flow 200, such that process flow 300 describes several of the underlying computer program processes which may assist in the execution of the process flow 200. The process flow 300 begins at block 302, wherein the system collects the status of the endpoint data, the status of the endpoint data recorded by the script as at least one binary output. As previously described, the endpoint data may comprise binary outputs. The at least one binary output may represent the binary data gathered from the endpoint device(s), and the at least one binary output may be stored on the memory device of the system.

The process continues in block 304, wherein the system aggregates the at least one binary output into an output package. While the system at this point in the process has collected the at least one binary output, the output package will contain the at least one binary output into a consolidated format or file, such as .csv, .txt, or the like. Accordingly, all of the endpoint data from the endpoint device is placed into a standardized format or organized in such a way as to later be analyzed and transformed by the dashboard, as will be described fully herein with respect to block 308.

It shall also be appreciated that in some embodiments, the binary outputs from a plurality of endpoint devices may be aggregated into an output package, such as to improve efficiency of the overall endpoint data collection and processing system. For example, the script may be executed at a plurality of endpoint devices at times in close proximity to each other, such as between the time period between 8:00 am and 9:00 am, and as such the system may hold or store the binary outputs in a memory device from each of the endpoint devices on which the script has executing during this time period. Thereafter, the binary outputs from the plurality of endpoint devices may then be all aggregated into a singular output package.

In some embodiments, the at least one binary output is identified by an endpoint identifier such that each of the at least one binary output is associated with a corresponding endpoint. Each of the binary outputs is associated with an endpoint device, and accordingly, the system may use an identifier from the endpoint device such as the username, UUID, MAC address, IP address, or the like to associate the binary outputs to the endpoint devices from which they came. The endpoint identifier may be stored alongside the binary output(s) in the output package. In this way, the system may be able to extract a list of endpoint devices, based on the binary outputs in the output package, which require additional endpoint tools, require the removal or update of endpoint tools, and so forth.

In some embodiments, there may be a plurality of output packages, each of the output packages associated with a corresponding endpoint to which the entirety of the output package originated. In such an embodiment, the output package itself may contain data, such as additional code, file naming conventions, or the like, which indicate the endpoint device from which the output package originated. Accordingly, the system may be able to extract a list of endpoint devices, based on the output packages, which require additional endpoint tools, require the removal or update of endpoint tools, and so forth.

The process then continues in block 306, wherein the system transmits the output package to a centralized inventory database. Prior to this point in the process, the system has executed one or more scripts at the endpoint device(s). In order to make full use of the endpoint data across an entity or enterprise, the endpoint data (at this point in one or more output packages) requires transmission to at least one centralized inventory database. In this way, a user associated with the entity can have access to the endpoint data within the output package(s) for further evaluation and analysis. The output package(s) is transmitted via the network 110. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

The process then continues in block 308, wherein the system transforms the output package into a dashboard, wherein transforming occurs in real time as new output packages are transmitted to the centralized inventory database. As the system receives output package(s), it may be beneficial for the system to transform the output package(s) and underlying endpoint data into a graphical display of said endpoint data in order for a user associated with the entity to view the endpoint data, organize, or group the binary output(s) in various ways such as in columns and rows, filter out erroneous endpoint data, view charts or graphs of the endpoint data, and so forth. Accordingly, the processing device of the system transforms the binary outputs from the endpoint data into graphical displays. In some embodiments these may be text displays on a spreadsheet, wherein the spreadsheet displays or lists the endpoint devices which contain certain endpoint data, such which endpoint devices do or do not contain the endpoint tool. In other embodiments, the spreadsheet may display totals, or mathematical sums, of the number or identifier of endpoint devices either (i) containing certain endpoint data, or (ii) not containing certain endpoint data. In additional embodiments, the output package may be transformed into graphical charts or graphs which illustrate a percentage or portion of the entity's endpoint devices which contain certain endpoint data, such as whether or not the device(s) contain an endpoint tool.

Moreover, in some embodiments this transformation into the dashboard may occur in real time, such that at any given point a user may view the dashboard and receive the most up to date graphical views or organization of endpoint data. As the system receives output packages from being transmitted to the centralized inventory database, the processing device of the system transforms each of the output packages into the graphical display via the dashboard in a first-in, first-first out ("FIFO") sequence. In some embodiments, the system may transform an aggregate of multiple output packages at once before moving on to the next aggregate of multiple output packages. In additional embodiments, the system may prioritize the transformation of certain output data based on a user's preferences, such as transforming all output data which is known to be associated with a certain operating system, endpoint tool, or the like.

In some embodiments, the dashboard may be structures to allow for user searching of the at least one binary output in the dashboard. As shall be appreciated, providing the entity and users associated with the entity with the ability to locate endpoint devices which do or do not conform to certain endpoint tool policies set by the entity is beneficial in providing said endpoint tools or updates thereto. Accordingly, the dashboard may be configured with a text input box to allow the receiving of a text entries or Boolean logic by a user in order to highlight certain phrases, terms, or other data associated with the endpoint tool, endpoint device operating system, endpoint device identifier, or the like. In this way, the user associated with the entity will present words, phrases, logic, operators, or the like to the text input box of the search function, and thereafter the system will filter or highlight binary outputs which are most relevant to the user's entry.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for script-based querying and aggregation of endpoint data via a directory access protocol, the system comprising:
   at least one non-transitory storage device; and
   at least one processor coupled to the at least one non-transitory storage device, wherein the at least one processor is configured to:
   deploy a directory access protocol executor to a plurality of endpoint devices, wherein the directory access protocol executor is previously installed on the plurality of endpoint devices, and wherein the directory access protocol executor communicates with a directory access protocol service located at a centralized server;
   determine an operating system for at least one of the plurality of endpoint devices;
   select a script to execute at the plurality of endpoint devices, the script selected from a plurality of scripts and corresponding to the operating system determined;
   execute the script via the directory access protocol executor, wherein the script is executed as a login script, wherein the script determines a status of endpoint data at the endpoint, and wherein the endpoint data comprises endpoint tools currently available at the endpoint;
   collect the status of the endpoint data, the status of the endpoint data recorded by the script as at least one binary output;
   aggregate the at least one binary output into an output package;
   transmit the output package to a centralized inventory database; and
   transform the output package into a dashboard, wherein transforming occurs in real time as new output packages are transmitted to the centralized inventory database.

2. The system of claim 1, wherein the endpoint data further comprises a usage status of the endpoint tools.

3. The system of claim 1, wherein the endpoint data further comprises a release version number of the endpoint tools.

4. The system of claim 2, wherein the usage status comprises:
   a timestamp of a previous session of the endpoint tools; and
   a duration of usage over an indicated time period.

5. The system of claim 1, wherein the dashboard is structured for grouping and searching of the at least one binary output.

6. The system of claim 5, wherein the at least one binary output is identified by an endpoint identifier such that each of the at least one binary output is associated with a corresponding endpoint.

7. A computer program product for script-based querying and aggregation of endpoint data via a directory access protocol, the computer program product comprising a non-transitory computer-readable medium comprising code causing an apparatus to:
   deploy a directory access protocol executor to a plurality of endpoint devices, wherein the directory access protocol executor is previously installed on the plurality of endpoint devices, and wherein the directory access protocol executor communicates with a directory access protocol service located at a centralized server;
   determine an operating system for at least one of the plurality of endpoint devices;
   select a script to execute at the plurality of endpoint devices, the script selected from a plurality of scripts and corresponding to the operating system determined;
   execute the script via the directory access protocol executor, wherein the script is executed as a login script, wherein the script determines a status of endpoint data at the endpoint, and wherein the endpoint data comprises endpoint tools currently available at the endpoint;
   collect the status of the endpoint data, the status of the endpoint data recorded by the script as at least one binary output;
   aggregate the at least one binary output into an output package;
   transmit the output package to a centralized inventory database; and transform the output package into a dashboard, wherein transforming occurs in real time as new output packages are transmitted to the centralized inventory database.

8. The computer program product of claim 7, wherein the endpoint data further comprises a usage status of the endpoint tools.

9. The computer program product of claim 7, wherein the endpoint data further comprises a release version number of the endpoint tools.

10. The computer program product of claim 8, wherein the usage status comprises:
   a timestamp of a previous session of the endpoint tools; and
   a duration of usage over an indicated time period.

11. The computer program product of claim 7, wherein the dashboard is structured for grouping and searching of the at least one binary output.

12. The computer program product of claim 11, wherein the at least one binary output is identified by an endpoint identifier such that each of the at least one binary output is associated with a corresponding endpoint.

13. A method for script-based querying and aggregation of endpoint data via a directory access protocol, the method comprising:
   deploying a directory access protocol executor to a plurality of endpoint devices, wherein the directory access protocol executor is previously installed on the plurality of endpoint devices, and wherein the directory access protocol executor communicates with a directory access protocol service located at a centralized server;
   determining an operating system for at least one of the plurality of endpoint devices;
   selecting a script to execute at the plurality of endpoint devices, the script selected from a plurality of scripts and corresponding to the operating system determined;
   executing the script via the directory access protocol executor, wherein the script is executed as a login script, wherein the script determines a status of endpoint data at the endpoint, and wherein the endpoint data comprises endpoint tools currently available at the endpoint;
   collecting the status of the endpoint data, the status of the endpoint data recorded by the script as at least one binary output;
   aggregating the at least one binary output into an output package;
   transmitting the output package to a centralized inventory database; and
   transforming the output package into a dashboard, wherein transforming occurs in real time as new output packages are transmitted to the centralized inventory database.

14. The method of claim 13, wherein the endpoint data further comprises a usage status of the endpoint tools.

15. The method of claim 13, wherein the endpoint data further comprises a release version number of the endpoint tools.

16. The method of claim 14, wherein the usage status comprises:
   a timestamp of a previous session of the endpoint tools; and
   a duration of usage over an indicated time period.

17. The method of claim 13, wherein the dashboard is structured for grouping and searching of the at least one binary output.

18. The method of claim 17, wherein the at least one binary output is identified by an endpoint identifier such that each of the at least one binary output is associated with a corresponding endpoint.

* * * * *